United States Patent
Sakthivel et al.

(10) Patent No.: US 11,561,878 B2
(45) Date of Patent: Jan. 24, 2023

(54) DETERMINING A FUTURE OPERATION FAILURE IN A CLOUD SYSTEM

(71) Applicant: Hewlett Packard Enterprise Development LP, Houston, TX (US)

(72) Inventors: Thavamaniraja Sakthivel, Bangalore Karnataka (IN); Siva Subramaniam Manickam, Bangalore Karnataka (IN); Vinnarasu Ganesan, Bangalore Karnataka (IN); Balaji Ramamoorthi, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 761 days.

(21) Appl. No.: 16/396,573

(22) Filed: Apr. 26, 2019

(65) Prior Publication Data
US 2020/0341881 A1    Oct. 29, 2020

(51) Int. Cl.
*G06F 9/50*      (2006.01)
*G06F 11/34*     (2006.01)

(52) U.S. Cl.
CPC ........ *G06F 11/3409* (2013.01); *G06F 9/5083* (2013.01); *G06F 11/3442* (2013.01); *G06F 2209/5019* (2013.01)

(58) Field of Classification Search
CPC .............. G06F 9/5083; G06F 11/3442; G06F 2209/5019
See application file for complete search history.

(56) References Cited

U.S. PATENT DOCUMENTS

| | | | |
|---|---|---|---|
| 8,145,455 B2 | 3/2012 | Cherkasova et al. | |
| 2006/0010101 A1 | 1/2006 | Suzuki et al. | |
| 2013/0138419 A1* | 5/2013 | Lopez | G06F 11/3058 703/21 |
| 2013/0339515 A1* | 12/2013 | Radhakrishnan | H04L 41/142 709/224 |

(Continued)

FOREIGN PATENT DOCUMENTS

CN      104991853      10/2015

OTHER PUBLICATIONS

Young Choon Lee, Energy efficient utilization of resources in cloud computing systems, Mar. 19, 2010,Springer Scient+Business Media; (Year: 2010).*

(Continued)

*Primary Examiner* — Dong U Kim
(74) *Attorney, Agent, or Firm* — Mauriel Kapouytian Woods LLP (57) ABSTRACT

Examples described relate to determining a future operation failure in a cloud system. In an example, a historical utilization of resources for performing an operation in a cloud system may be determined. A current utilization of resources in the cloud system may be determined. Based on the historical utilization of resources for performing the operation in the cloud system and the current utilization of resources in the cloud system, a determination may be made whether a future performance of the operation in the cloud system is likely to be a failure. In response to a determination that the future performance of the operation in the cloud system is likely to be a failure, an alert may be generated.

18 Claims, 5 Drawing Sheets

(56) References Cited

U.S. PATENT DOCUMENTS

| | | | |
|---|---|---|---|
| 2015/0193325 A1* | 7/2015 | Harsan-Farr | G06F 11/008 702/186 |
| 2015/0249512 A1* | 9/2015 | Adimatyam | H04H 20/12 725/107 |
| 2018/0129528 A1 | 5/2018 | Gokavarapu et al. | |

OTHER PUBLICATIONS

Hayden James, "20 Top Server Monitoring & Application Performance Monitoring Solutions", available online at <https://web.archive.org/web/20190403132252/https://haydenjames.io/20-top-server-monitoring-application-performance-monitoring-apm-solutions/>, Nov. 23, 2018, 34 pages.

Lukasz Cmielowski, "Adoption of machine learning to software failure prediction", available online at <https://medium.com/ibm-data-science-experience/adoption-of-machine-learning-to-software-failure-prediction-e8d85ed0338f>, Oct. 20, 2017, 10 pages.

Micro Focus, "Micro Focus SiteScope", Jun. 2018, 4 pages.

Fadishei, H., et al.; "Job Failure Prediction in Grid Environment Based on Workload Characteristics"; Dec. 8, 2009; 7 pages.

* cited by examiner

DETERMINING A FUTURE OPERATION FAILURE IN A CLOUD SYSTEM

BACKGROUND

The advent of cloud-based computing architectures has opened new possibilities for businesses. As a result, an increasing number of enterprises are adopting cloud computing based solutions. Generally speaking, cloud computing involves delivery of computing as a service rather than a product, whereby shared resources (e.g., servers, network components, storage resources, etc.) are provided to computing devices as a service. The resources are shared over a network such as the internet. Cloud computing thus provides a quick and scalable access to computing resources and information technology (IT) services.

BRIEF DESCRIPTION OF THE DRAWINGS

For a better understanding of the solution, examples will now be described, with reference to the accompanying drawings, in which.

DETAILED DESCRIPTION

Cloud computing is a delivery model for technology-enabled services that provides on-demand and pay-as-you-use access to an elastic pool of shared computing resources. Some examples of such resources may include applications, servers, storage, networks, etc. Cloud computing allows rapid provisioning of computing resources that could be scaled up or down depending on the requirements of a customer. Thus, these assets may be consumed "as a service".

One of the reasons behind the success of cloud computing is a technology called virtualization. Virtualization allows creation of a virtual version of a resource such as an operating system, a hardware platform, a storage resource etc. which may be shared, for instance, among different clients. Multiple virtual machines (VMs) may be created on a host device (for example, a server).

As used herein, the term "cloud system" (or "cloud") may refer to an on-demand network access to a shared pool of information technology resources (e.g., networks, servers, storage, and/or applications) that can be quickly provisioned. A cloud system may include a public cloud, a private cloud, or a hybrid cloud. To explain briefly, a cloud may be termed a public cloud if cloud computing services are rendered over a public network such as the internet. On the other hand, a private cloud is a proprietary network that supplies services to a specific set of users. A hybrid cloud combines private and public cloud services.

In a cloud system, various services may run in a distributed fashion and interact with each other through a network. When an operation is triggered, services may interact with each other and complete the operation. Predicting when an operation may fail is a complex task. There could be a discrete operation which may get triggered randomly and may fail at any point of time due to insufficient resources. For example, a VM vending operation may impact multiple services as the operation may involve, for example, an API service, a catalog service and a virtualization service. VM vending operation is a CPU and memory intensive operation which may succeed if the overall usage of resources in the cloud system is less. But the VM vending operation may fail if the overall resource usage level is high. Without knowing the impact that an operation may create on a cloud system, it is challenging to provide an alerting solution. It is challenging to derive the impact of an operation in advance, predicting a future failure based on past current utilization of resources, and providing an alert before the actual failure of an operation.

To address these technical challenges, the present disclosure describes various examples for determining a future operation failure in a cloud system. In an example, a historical utilization of resources for performing an operation in a cloud system may be determined. Also, a current utilization of the resources in the cloud system may be determined. Based on the historical utilization of the resources for performing the operation in the cloud system and the current utilization of the resources in the cloud system, a determination may be made whether a future performance of the operation in the cloud system is likely to be a failure. In response to a determination that the future performance of the operation in the cloud system is likely to be a failure, an alert may be generated that may indicate that the future performance of the operation in the cloud system is likely to be a failure.

Figure 1:
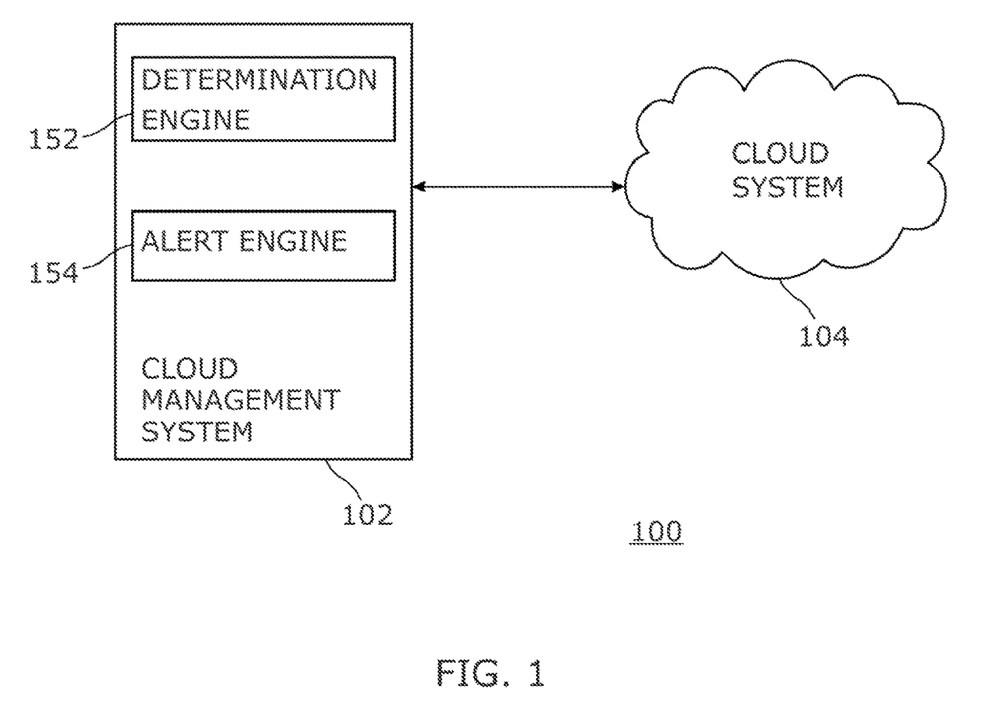
FIG. 1 is a block diagram of an example computing environment for determining a future operation failure in a cloud system.

FIG. 1 is a block diagram of an example computing environment 100 for determining a future operation failure in a cloud system. In an example, computing environment 100 may include a cloud management system 102, and a cloud system 104. Although one cloud system is shown in FIG. 1, other examples of this disclosure may include more than one cloud system.

In an example, cloud management system 102 may represent any type of computing device capable of reading machine-executable instructions. Examples of the computing device may include, without limitation, a server, a desktop computer, a notebook computer, a tablet computer, a thin client, a mobile device, and the like.

In an example, cloud system 104 may include resources. As used herein, the "resources" of a cloud system 104 may refer to software resources (machine-executable instructions) or hardware resources. These may include, for example, computing resources, network resources, and/or storage resources. Computing resources may be a hardware computing resource (e.g., includes at least one processor). The hardware computing resource may represent any type of system capable of reading machine-executable instructions. Examples of the hardware computing resource may include a server, a desktop computer, a notebook computer, a tablet computer, a thin client, a mobile device, a personal digital assistant (PDA), and the like. In an example, computing resources may represent software resources (machine-executable instructions). The software resources may include, for example, operating system software, firmware, and application software. Other examples of the software resources may include virtual machines, virtual servers, load balancers, firewalls, etc. In an example, computing resources may be a combination of hardware and software resources.

Network resources may include a network device, a network software, or any combination thereof. Some non-limiting examples of the network device may include a hub, a network switch, a network router, a virtual switch, and a virtual router.

Storage resources may include a storage device, a storage software, or any combination thereof. The storage device may be an internal storage device, an external storage device, or a network attached storage device. Other examples of the storage device may include a hard disk drive, a storage disc (for example, a CD-ROM, a DVD, etc.), a storage tape, a solid state drive, a USB drive, a Serial Advanced Technology Attachment (SATA) disk drive, a Fibre Channel (FC) disk drive, a Serial Attached SCSI (SAS) disk drive, a magnetic tape drive, an optical jukebox, and the like. In other examples, the storage device may be a Direct Attached Storage (DAS) device, a Network Attached Storage (NAS) device, a Redundant Array of Inexpensive Disks (RAID), a data archival storage system, or a block-based device over a storage area network (SAN).

The resources may be accessed by users or by applications, for example, for providing or deploying a cloud service. In an example, cloud system 104 may provide or deploy various types of cloud services. These services may include, for example, Infrastructure as a Service (IaaS), Platform as a Service (PaaS), and Software as a Service (SaaS).

In an example, cloud management system 102 may be used to manage resources (e.g., computing resources, network resources, and/or storage resources) on cloud system 104. In an example, one or more resources may be used by the cloud management system 102 to provide a cloud service (for example, IaaS) to a user. A user may use cloud management system 102 to request a new cloud service and manage an existing cloud service. Users may also use cloud management system 102 to view a status of a pending cloud service request, pending approvals, and approved service subscriptions.

In an example, cloud system 104 may be a public cloud, a private cloud, or a hybrid cloud. In a public cloud, cloud resources (like servers and storage) may be owned and operated by a third-party cloud service provider and delivered over a network (e.g., the Internet). In a public cloud, cloud resources may be shared with other organizations. On the other hand, in private cloud, cloud resources may be used exclusively by one organization.

In an example, cloud management system 102 may be communicatively coupled with cloud system 104, for example, via a computer network. The computer network may be a wireless or wired network. The computer network may include, for example, a Local Area Network (LAN), a Wireless Local Area Network (WAN), a Metropolitan Area Network (MAN), a Storage Area Network (SAN), a Campus Area Network (CAN), or the like. Further, the computer network may be a public network (for example, the Internet) or a private network (for example, an intranet).

In an example, cloud management system 102 may include a determination engine 152 and an alert engine 154.

Engines 152 and 154 may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of the cloud management system 102. In some examples, the at least one machine-readable storage medium may store instructions that, when executed by the at least one processing resource, at least partially implement some or all engines of the computing device. In such examples, the cloud management system 102 may include the at least one machine-readable storage medium storing the instructions and the at least one processing resource to execute the instructions. In an example, cloud management system 102 may be any combination of hardware and programming.

In an example, determination engine 152 may determine a historical utilization of resources for performing an operation in cloud system 104. As mentioned earlier, "resources" in a cloud system (e.g., 104) may refer to software resources (machine-executable instructions) or hardware resources. These may include, for example, computing resources, network resources, and/or storage resources. As used herein, an "operation" may refer to any functionality, service, activity, etc., which may be capable of being executed in, instantiated by, performed by, supported by, or delivered through a cloud (e.g., cloud system 104).

To provide an example, for an operation involving creation of a virtual machine (VM) with the operation data as indicated in Table 1 below, determination engine 152 may determine historical utilization of resources, for example, CPU utilization average ("CPU Avg"), memory utilization average ("Memory Avg"), network utilization ("Network Throughput—Avg) and storage utilization ("Disk Throughput Avg), for performing the VM creation operation in cloud system 104, as indicated in Table 2.

TABLE 1

| Operation | Start Time | End Time |
|---|---|---|
| Create VM | 12/10/2018 13:10:09 PM | 12/10/2018 13:13:09 PM |
| Suspend VM | 12/10/2018 18:15:10 PM | 12/10/2018 18:18:10 PM |

TABLE 2

| Timestamp | CPU Avg | Memory Avg | Network Throughput -Avg | Disk Throughput Avg |
|---|---|---|---|---|
| 12/10/2018 13:08:09 PM | 1 | 3 | 5 MB/s | 10 MB/s |
| 12/10/2018 13:09:09 PM | 1 | 2 | 5 MB/s | 11 MB/s |
| 12/10/2018 13:10:09 PM | 10 | 15 | 12.5 MB/s | 49 MB/s |
| 12/10/2018 13:11:10 PM | 12 | 16 | 12.5 MB/s | 45 MB/s |
| 12/10/2018 13:12:09 PM | 12 | 15 | 11.5 MB/s | 46 MB/s |
| 12/10/2018 13:13:09 PM | 13 | 16 | 11.5 MB/s | 47 MB/s |

In an example, determining the historical utilization of resources for performing an operation in cloud system 104 may include determining a historical utilization of computing resources, network resources, and/or storage resources over a given time period. Examples of the time period may include a minute, an hour, a day, a month, a year, etc.

In an example, determining the historical utilization of resources for performing an operation in cloud system 104 may comprise first determining a historical utilization of the resources for performing the operation in the cloud system 104 over a given time period when no other operations are running on cloud system 104 except the operation that is under monitoring. To provide an example, historical utilization of resources ("X") for performing a VM creation operation in cloud system 104 may be as given in Table 3 below.

TABLE 3

| Operation | CPU Avg | Memory Avg | Network Throughput -Avg | Disk Throughput Avg |
|---|---|---|---|---|
| Create VM | 11.75 | 15.5 | 12 | 46.75 |

Determination engine 152 may also determine an average utilization of the resources in an idle state of cloud system 104 during the same time period. As used herein, an idle state may be defined as a state when no operations are running on cloud system 104 in a given time period. To continue with the above example, average utilization of resources ("Y") for the given time period may be as given in Table 4 below.

TABLE 4

| CPU Avg | Memory Avg | Network Throughput -Avg | Disk Throughput Avg |
|---|---|---|---|
| 1 | 2.5 | 5 | 10.5 |

Determination engine 152 may then determine the historical utilization of the resources for performing the operation in cloud system 104 by deducting the historical utilization of the resources ("X") for performing the operation in the cloud system 104 over the same time period from the average utilization of the resources ("Y") during the given time period i.e. ("Z=X-Y"). In the context of the VM creation example above, the historical utilization of resources for performing the VM creation operation may be as given in Table 5 below.

TABLE 5

| Timestamp | API | CPU | Memory | Network Throughput | Disk Throughput |
|---|---|---|---|---|---|
| 12/10/2018 13:10:09 PM | Create VM | 10.75 | 13 | 7 MB/s | 36.25 MB/s |

In an example, determination engine 152 may store the historical utilization of resources for performing an operation in cloud system 104 on cloud management system 102.

Determination engine 152 may determine a current utilization of the resources in cloud system 104. In an example, determining the current utilization of resources in the cloud system 104 may include determining a current utilization of computing resources, network resources, and/or storage resources in cloud system 104.

Determination engine 152 may determine based on the historical utilization of the resources for performing an operation in the cloud system 104 and the current utilization of the resources in the cloud system 104 whether a future performance of the operation in the cloud system 104 is likely to be a failure. In an example, determining whether the future performance of the operation in the cloud system 104 is likely to be a failure includes determining whether the historical utilization of the resources for performing of the operation in the cloud system 104 and the current utilization of the resources in the cloud system 104 together exceeds a threshold utilization level defined for each of the resources for performing the operation in the cloud system 104.

To provide an example, consider a Kubernetes cluster with multiple pods running on a cluster system. Now, consider a backup operation which may run, by way of an example, once in a week as a container. The backup operation may be CPU and disk intensive on the cluster system. If the backup operation runs on a container in the Kubernetes cluster and takes about 20% of the CPU during backup when the Kubernetes cluster system, for example, is 60% used, the backup operation may get successfully completed. However, as the usage of the Kubernetes cluster increases in future with more and more pods spawned on the Kubernetes cluster, there could be a scenario when the average CPU utilization level of the Kubernetes cluster system may become more than 85%. In such case, when the backup operation occurs during a scheduled time, the backup operation may be stalled since the CPU availability for the backup operation may not be enough. This could result in a failure of the backup operation. In such case, determination engine 152 may determine based on the historical utilization of resources (e.g., CPU) on Kubernetes cluster for performing the backup operation, and the current utilization of resources in the Kubernetes cluster whether a future performance of the backup operation in the Kubernetes cluster is likely to be a failure.

In response to a determination that the future performance of the operation in the cloud system 104 is likely to be a failure, alert engine 154 may generate an alert to that affect. In an example, the alert may be generated prior to a future performance of the operation in cloud system 104.

Figure 2:
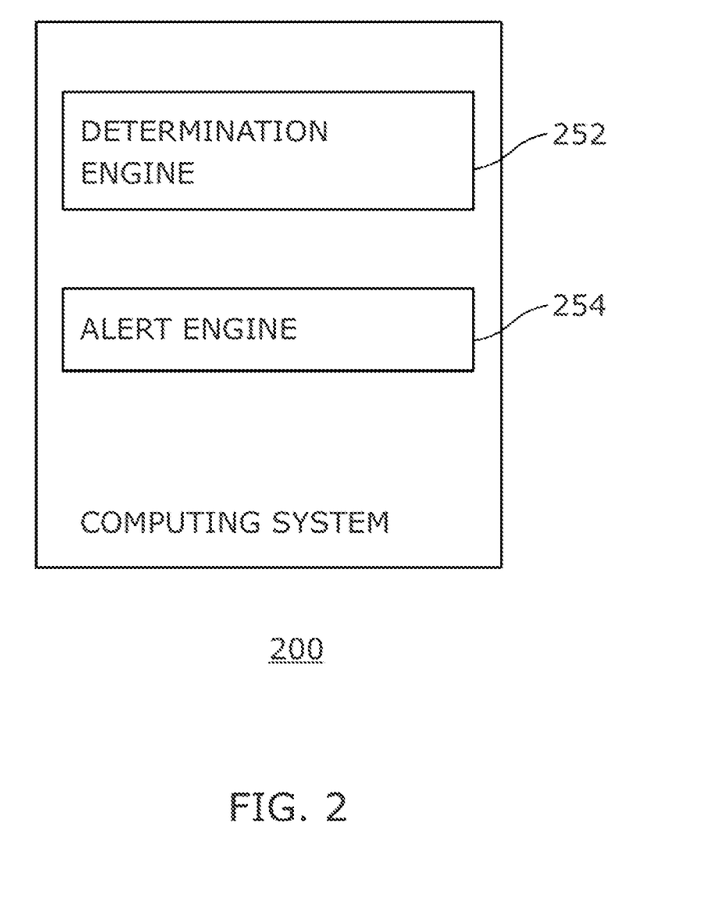
FIG. 2 is a block diagram of an example computing system for determining a future operation failure in a cloud system.

FIG. 2 is a block diagram of an example computing system 200 determining a future operation failure in a cloud system 104. In an example, computing system 200 may be analogous to the cloud management system 102 of FIG. 1, in which like reference numerals correspond to the same or similar, though perhaps not identical, components. For the sake of brevity, components or reference numerals of FIG. 2 having a same or similarly described function in FIG. 1 are not being described in connection with FIG. 2. Said components or reference numerals may be considered alike.

In an example, computing system 200 may represent any type of computing device capable of reading machine-executable instructions. Examples of computing device may include, without limitation, a server, a desktop computer, a notebook computer, a tablet computer, a thin client, a mobile device, and the like.

In an example, computing system 200 may include a determination engine 252 and an alert engine 254. In an example, determination engine 252 and alert engine 254 may perform functionalities similar to those described earlier in reference to determination engine 152 and alert engine 154 of FIG. 1, respectively.

In an example, determination engine 252 may determine a historical utilization of resources for performing an operation in a cloud system 104. Determination engine 252 may determine a current utilization of the resources in the cloud system 104. Determination engine 252 may then determine based on the historical utilization of the resources for performing the operation in the cloud system 104 and the current utilization of the resources in the cloud system 104 whether a future performance of the operation in the cloud system 104 is likely to be a failure. In response to a determination that the future performance of the operation in the cloud system 104 is likely to be a failure, alert engine 254 may generate alert providing an indication related thereto.

Figure 3:
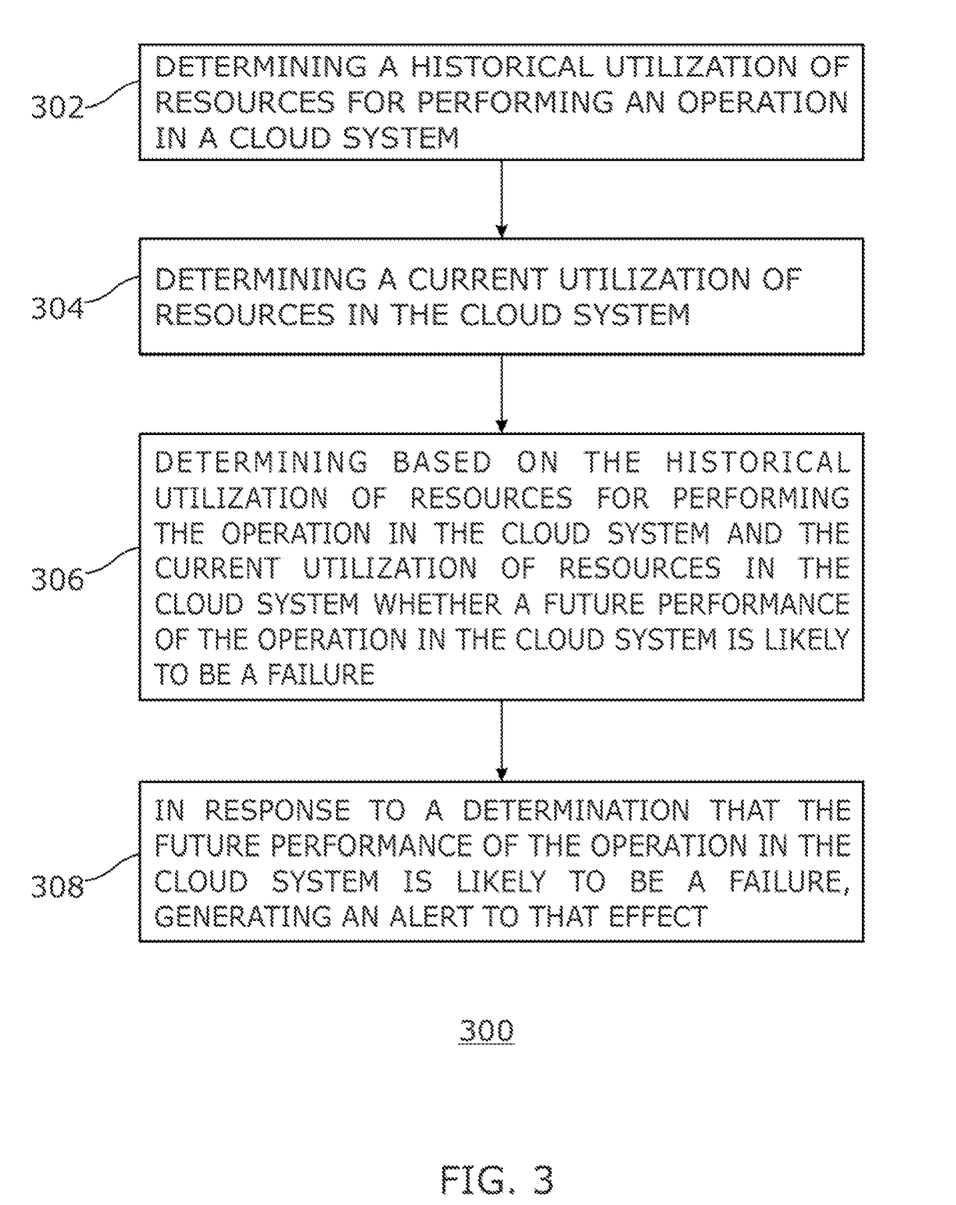
FIG. 3 is a flowchart of an example method of determining a future operation in a cloud system.
Figure 4:
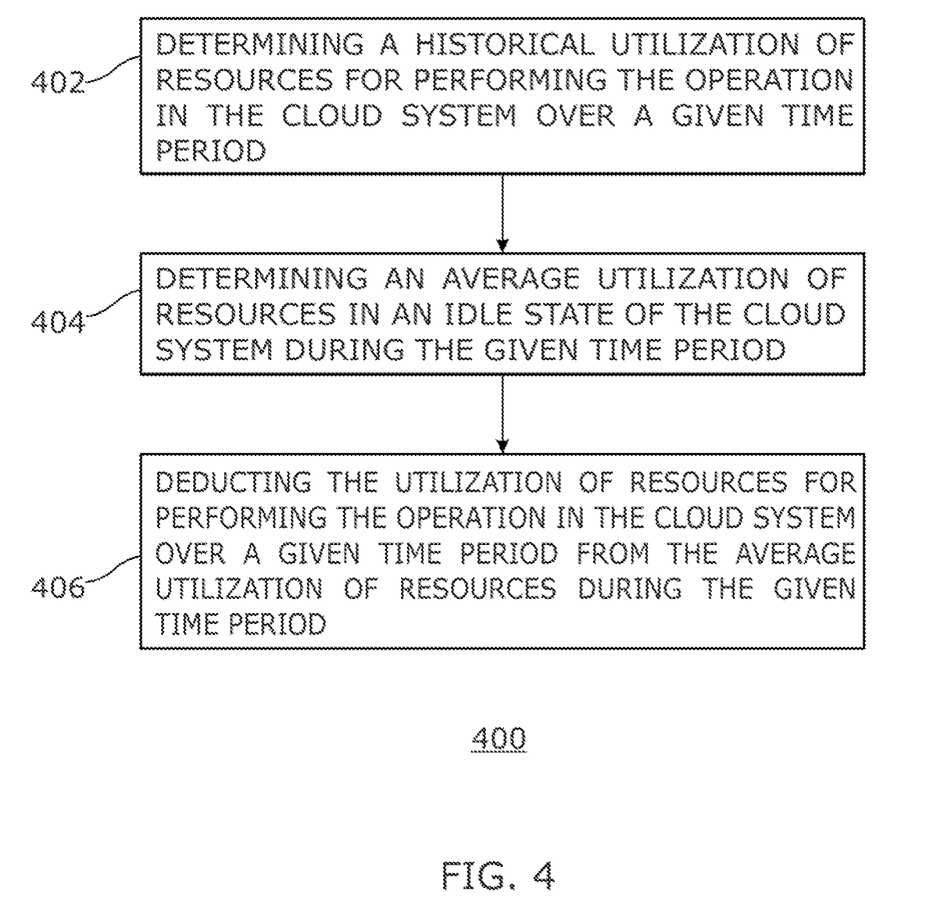
FIG. 4 is a flowchart of an example method of determining a future operation failure in a cloud system.

FIG. 3 is a flowchart of an example method 300 of determining a future operation failure in a cloud system 104. The method 300, which is described below, may be executed on a computing device such as cloud management system 102 of FIG. 1 or computing system 200 of FIG. 2. However, other computing devices may be used as well. At block 302, a historical utilization of resources for performing an operation in a cloud system (e.g., 104) may be determined. In an example, determining the historical utilization of resources for performing the operation in a cloud system may include example method 400, as illustrated in FIG. 4. At block 402, a historical utilization of the resources for performing the operation in the cloud system over a given time period may be determined. At block 404, an average utilization of the resources in an idle state of the cloud system during the given time period may be determined. At block 406, the utilization of the resources for performing the operation in the cloud system over a given time period may be deducted from the average utilization of the resources during the given time period.

At block 304, a current utilization of the resources in the cloud system may be determined. At block 306, based on the historical utilization of the resources for performing the operation in the cloud system and the current utilization of the resources in the cloud system, a determination may be made whether a future performance of the operation in the cloud system is likely to be a failure. In an example, determining whether the future performance of the operation in the cloud system is likely to be a failure includes determining whether the historical utilization of the resources for performing of the operation in the cloud system and the current utilization of the resources in the cloud system together exceeds a threshold utilization level defined for each of the resources for performing the operation in the cloud system.

At block 308, in response to a determination that the future performance of the operation in the cloud system is likely to be a failure, an alert may be generated that may indicate that the future performance of the operation in the cloud system is likely to be a failure.

Figure 5:
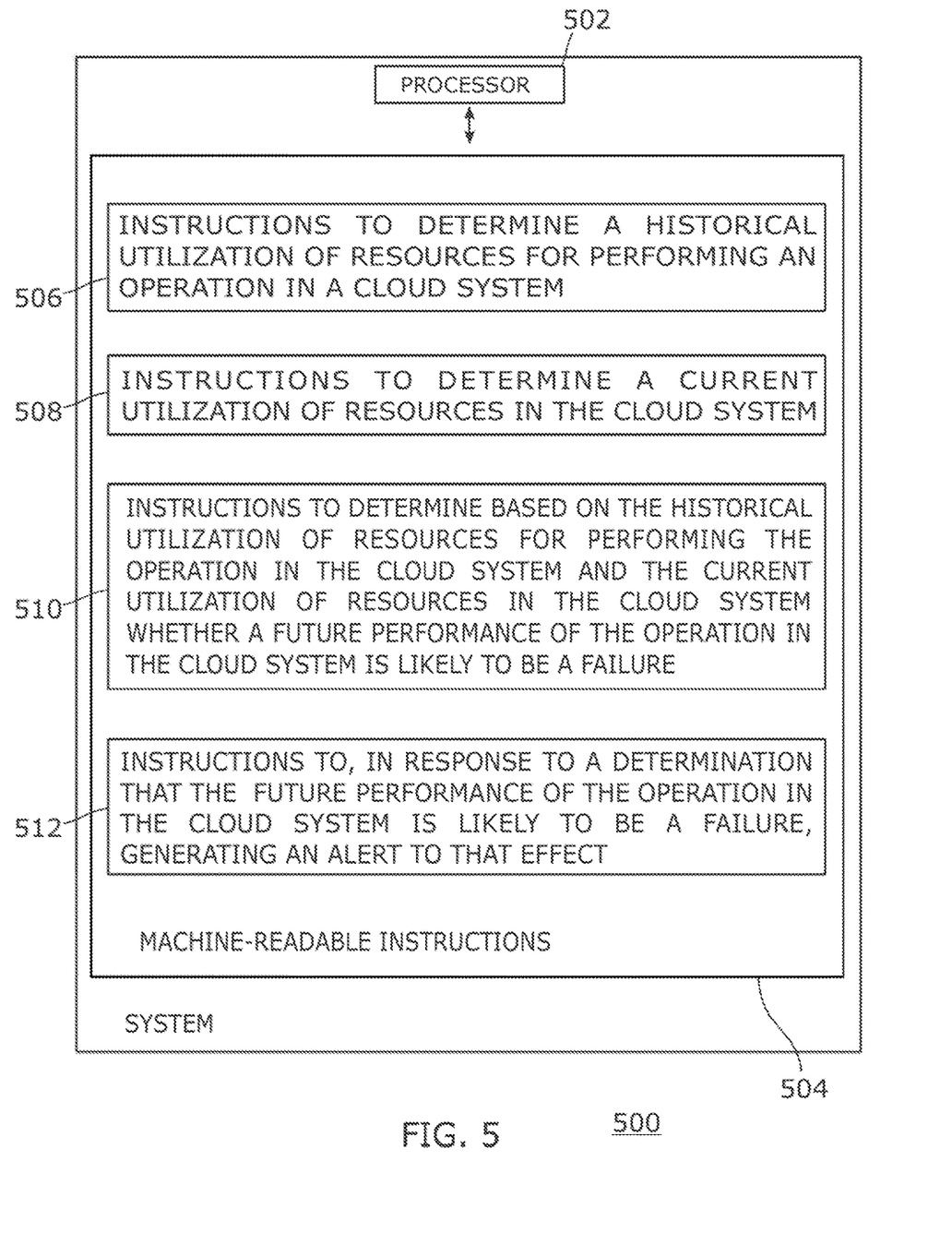
FIG. 5 is a block diagram of an example system including instructions in a machine-readable storage medium for determining a future operation failure in a cloud system.

FIG. 5 is a block diagram of an example system 500 including instructions in a machine-readable storage medium for determining a future operation failure in a cloud system. System 500 includes a processor 502 and a machine-readable storage medium 504 communicatively coupled through a system bus. In some examples, system 500 may be analogous to a cloud management system 102 of FIG. 1 or computing system 200 of FIG. 2. Processor 502 may be any type of Central Processing Unit (CPU), microprocessor, or processing logic that interprets and executes machine-readable instructions stored in machine-readable storage medium 504. Machine-readable storage medium 504 may be a random access memory (RAM) or another type of dynamic storage device that may store information and machine-readable instructions that may be executed by processor 502. For example, machine-readable storage medium 504 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 504 may store instructions 506, 508, 510, and 512.

In an example, instructions 506 may be executed by processor 502 to determine a historical utilization of resources for performing an operation in a cloud system. Instructions 508 may be executed by processor 502 to determine a current utilization of the resources in the cloud system. Instructions 510 may be executed by processor 502 to determine based on the historical utilization of the resources for performing the operation in the cloud system and the current utilization of the resources in the cloud system whether a future performance of the operation in the cloud system is likely to be a failure. Instructions 512 may be executed by processor 502 to, in response to a determination that the future performance of the operation in the cloud system is likely to be a failure, generate an alert.

For the purpose of simplicity of explanation, the example methods of FIGS. 3 and 4 are shown as executing serially, however it is to be understood and appreciated that the present and other examples are not limited by the illustrated order. The example systems of FIGS. 1, 2 and 5, and methods of FIGS. 3 and 4 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution.

The invention claimed is:

1. A method, comprising:
  determining a historical utilization of resources for performing an operation in a cloud system, wherein determining the historical utilization of resources includes:
    determining an average historical utilization of the resources over a given time period;
    determining a previous utilization of the resources in an idle state of the cloud system during the given time period, wherein the idle state defines a state when no operations are running on the cloud system but resources of the cloud system are being utilized; and
    deducting the previous utilization of the resources in the idle state of the cloud system from the average historical utilization of the resources for performing the operation during the given time period;
  determining a current utilization of the resources in the cloud system;
  determining based on the historical utilization of the resources for performing the operation in the cloud system and the current utilization of the resources in the cloud system whether a future performance of the operation in the cloud system is likely to be a failure; and in response to a determination that the future performance of the operation in the cloud system is likely to be a failure, generating an alert comprising an indication of a failure condition.

2. The method of claim 1, wherein the idle state includes a state when no operation is being implemented in the cloud system.

3. The method of claim 1, wherein determining whether the future performance of the operation in the cloud system is likely to be a failure includes:
determining whether the historical utilization of the resources for performing of the operation in the cloud system and the current utilization of the resources in the cloud system together exceeds a threshold utilization level defined for each of the resources for performing the operation in the cloud system.

4. The method of claim 1, wherein the alert is generated prior to the future performance of the operation in the cloud system.

5. The method of claim 1, wherein determining the historical utilization of the resources for performing the operation in the cloud system comprises determining a historical utilization of at least one of computing resources, network resources, and storage resources for performing the operation in the cloud system over a given time period.

6. The method of claim 1, wherein the cloud system is a private cloud system.

7. The method of claim 1, wherein the cloud system is a public cloud system.

8. A system, comprising:
at least one computer readable memory storing determination software instructions and alert software instructions;
at least one processor coupled with the at least one computer-readable memory and that, upon execution of the determination software instructions, operates as a determination engine to:
determine a historical utilization of resources for performing an operation in a cloud system, wherein determining the historical utilization of resources includes operating to:
determine an average historical utilization of the resources over a given time period;
determine a previous utilization of the resources in an idle state of the cloud system during the given time period, wherein the idle state defines a state when no operations are running on the cloud system but resources of the cloud system are being utilized; and
deduct the previous utilization of the resources in the idle state of the cloud system from the average historical utilization of the resources for performing the operation during the given time period;
determine a current utilization of the resources in the cloud system; and
determine based on the historical utilization of the resources for performing the operation in the cloud system and the current utilization of the resources in the cloud system whether a future performance of the operation in the cloud system is likely to be a failure; and
at least one processor coupled with the at least one computer-readable memory and that, upon execution of the alert software instructions, operates as an alert engine to:
in response to a determination that the future performance of the operation in the cloud system is likely to be a failure, generate alert providing an indication of a failure condition.

9. The system of claim 8, wherein determining the current utilization of the resources in the cloud system include determining a current utilization of at least one of computing resources, network resources, and storage resources in the cloud system.

10. The system of claim 9, wherein the computing resources include one of a server, a desktop computer, a notebook computer, a tablet computer, a thin client, a mobile device, and a personal digital assistant (PDA).

11. The system of claim 9, wherein the network resources include one of a network switch, a network router, and a hub device.

12. The system of claim 9, wherein the storage resources include one of an internal storage device, an external storage device, and a network attached storage device.

13. A non-transitory machine-readable storage medium comprising instructions, the instructions executable by a processor to:
determine a historical utilization of resources for performing an operation in a cloud system, wherein determining the historical utilization of resources includes instructions to:
determine an average historical utilization of the resources over a given time period;
determine a previous utilization of the resources in an idle state of the cloud system during the given time period, wherein the idle state defines a state when no operations are running on the cloud system but resources of the cloud system are being utilized; and
deduct the previous utilization of the resources in the idle state of the cloud system from the average historical utilization of the resources for performing the operation during the given time period;
determine a current utilization of the resources in the cloud system;
determine based on the historical utilization of the resources for performing the operation in the cloud system and the current utilization of the resources in the cloud system whether a future performance of the operation in the cloud system is likely to be a failure; and
in response to a determination that the future performance of the operation in the cloud system is likely to be a failure, generate an alert comprising an indication of a failure condition.

14. The storage medium of claim 13, further comprising instructions to store the historical utilization of the resources for performing the operation in the cloud system.

15. The storage medium of claim 13, wherein the cloud system is a hybrid cloud system.

16. The storage medium of claim 13, wherein instructions to determine the historical utilization of the resources for performing the operation in the cloud system comprise instructions to determine a historical utilization of at least one of computing resources, network resources, and storage resources for performing the operation in the cloud system over a given time period.

17. The storage medium of claim 16, wherein the given time period includes one of a minute, an hour, a day, a month, or a year.

18. The storage medium of claim 13, wherein the resources include one of computing resources, network resources, and storage resources.

\* \* \* \* \*